UNITED STATES PATENT OFFICE.

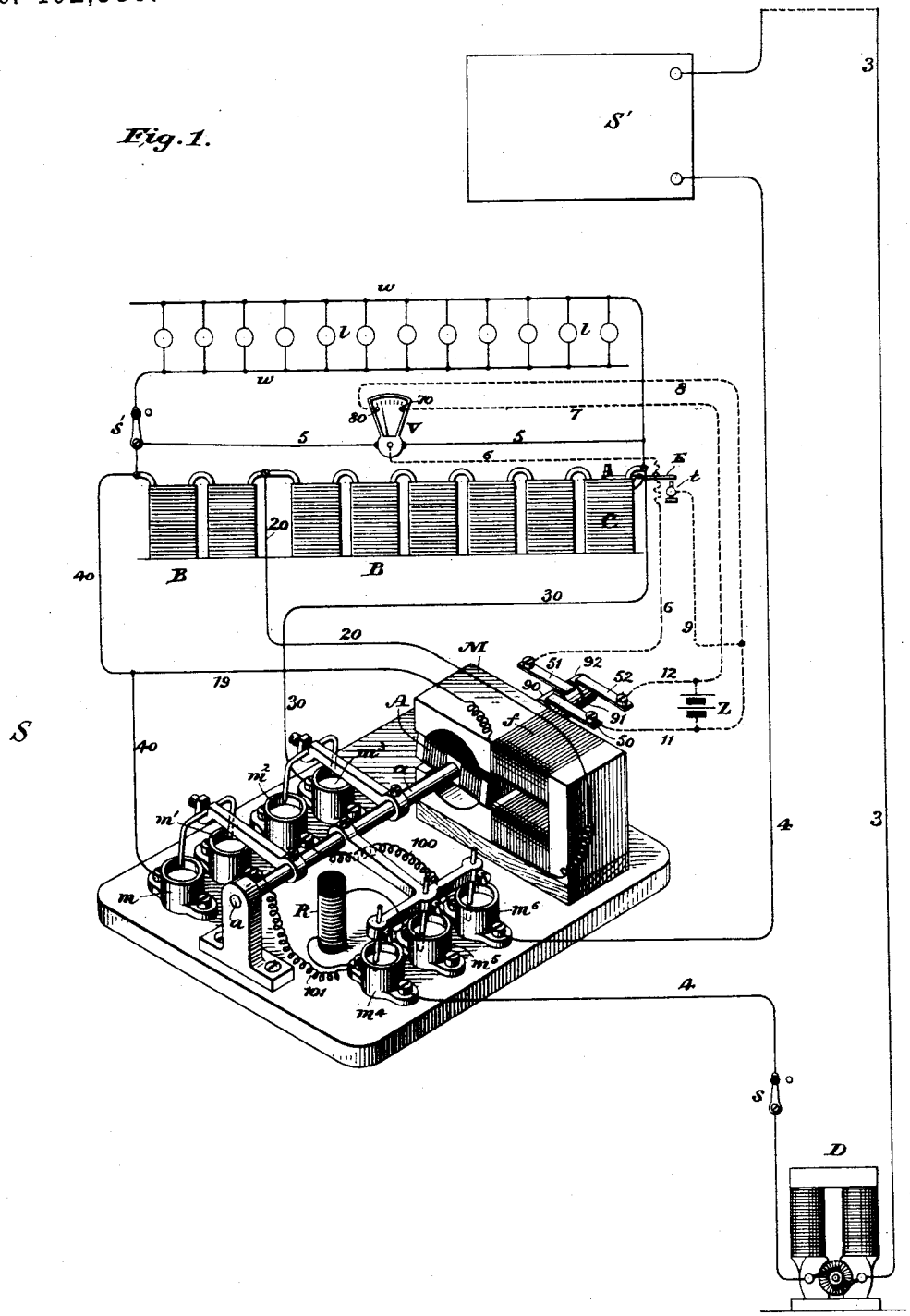

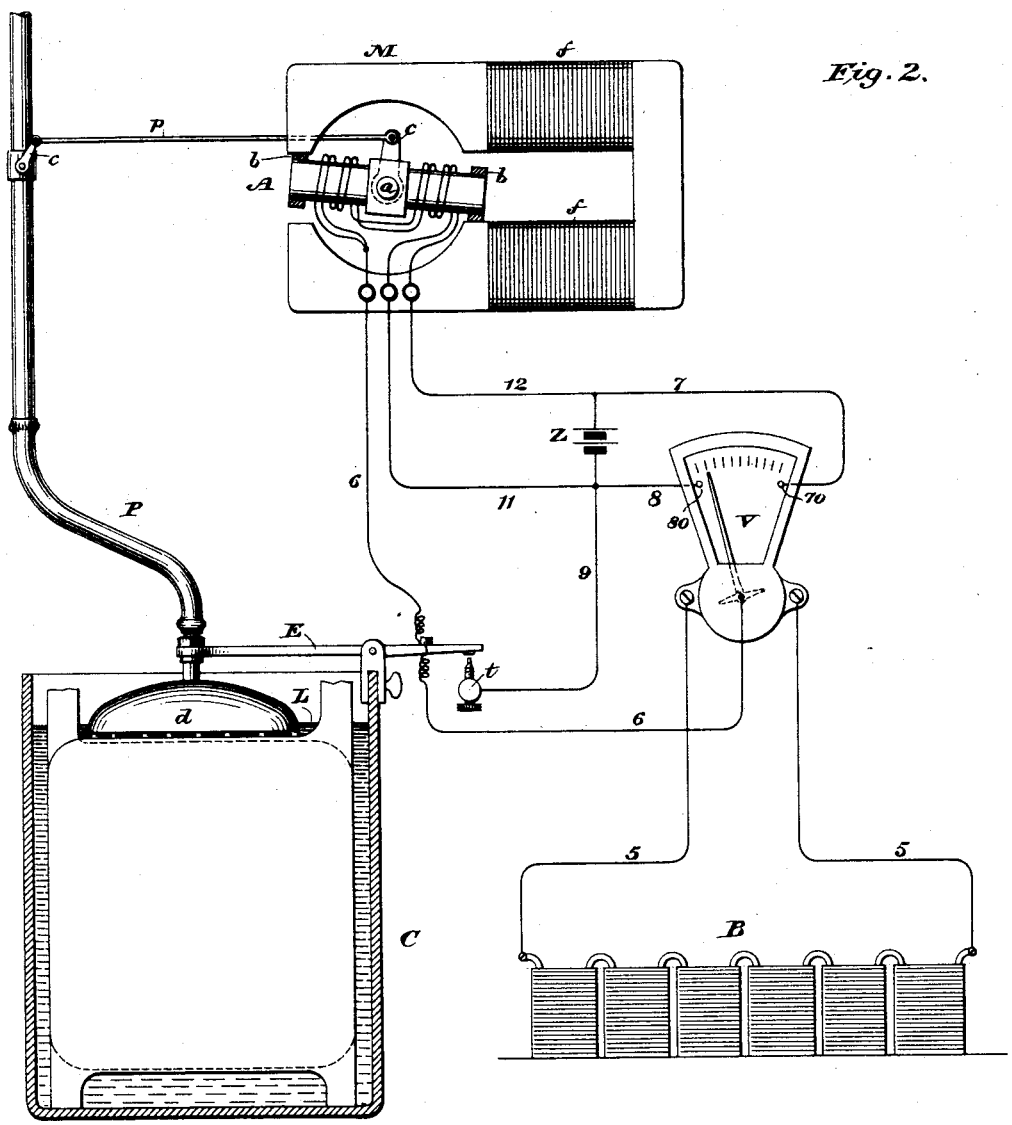

WILLIAM W. GRISCOM, OF HAVERFORD COLLEGE, ASSIGNOR TO THE ELECTRO DYNAMIC COMPANY, OF PHILADELPHIA, PENNSYLVANIA.

DISTRIBUTION OF ELECTRICITY BY SECONDARY BATTERIES.

SPECIFICATION forming part of Letters Patent No. 402,586, dated May 7, 1889.

Application filed February 2, 1889. Serial No. 298,437. (No model.)

*To all whom it may concern:*

Be it known that I, WILLIAM W. GRISCOM, a citizen of the United States, and a resident of Haverford College, in the county of Montgomery and State of Pennsylvania, have invented certain new and useful Improvements in the Distribution of Electricity by Secondary Batteries, of which the following is a specification.

My invention is an improvement in the distribution of electricity by secondary batteries.

The invention contemplates the use of a main station where there is located a primary generator of electricity, and a series of sub-stations, at each of which there is located a secondary battery, and lamps or other similar translating devices to be supplied from the battery. The primary generator is connected with the secondary batteries by an electrical conductor, called by me the "charging-circuit."

My invention particularly relates to the construction and arrangement of apparatus for automatically including and excluding a secondary battery with respect to the charging-circuit, depending for its action or control upon the state or condition of the battery as regards its charge.

I provide a switching device for changing the connection of the battery with respect to the charging-circuit, and a compensating resistance substantially equal in its effect upon the charging-circuit to the counter electromotive force of the battery. This is used to avoid sparking when the change is made, and to anticipate the production of the conditions in the charging-circuit due to the insertion of the battery and as a preliminary step to the introduction of the battery. A polarized magnet of special form and construction, designed to operate quickly and powerfully, is used to change the position of the switching device, and an electrical indicating-instrument in a local circuit with the polarized magnet operates to control the magnet and to introduce or withdraw the battery. I also provide a master-cell operating a circuit-closer in the local circuit to withdraw the battery when the point of full charge is reached by the battery. In this action it supplements, co-operates with, or duplicates one of the functions of the indicating-instrument referred to, and furnishes a safeguard against overcharge. It also furnishes a safety-switch to withdraw the battery if the rate of charge is too rapid or the intensity of the charging-current too great.

The accompanying drawings illustrate my invention.

Figure 1 is a complete view of the installation. Fig. 2 shows enlarged details of the indicating-instrument and connections with the local circuit, and the construction and arrangement of the master-cell.

D is a dynamo-electric machine located at a main or central station.

S and S' are similarly-arranged sub-stations connected with the dynamo D by a charging-circuit, 3 4. At each sub-station there is a secondary battery, B, composed of a series of cells. A working-circuit, $w$, contains lamps 1, to be supplied from the battery. Switches $s\ s'$ in the charging-circuit and in the working-circuit are for dividing said circuits when occasion requires.

The switching device for including the battery in the charging-circuit consists of a double pole-switch for the battery-circuit and a similar switch for the charging-circuit. Each switch consists of mercury-cups $m\ m^6$ and metallic pins or contacts carried upon arms which are fixed to an arbor, $a$. This arbor $a$ rotates in suitable bearings fixed to a base-board of insulating material. The several arms are insulated from the arbor and from each other.

M is a polarized magnet having something the form and arrangement of a dynamo, with opposing magnetic poles somewhat separated. The field-coil $f$ is included in circuit 19 20 with one or two cells of battery, whereby it is permanently polarized. Between the poles and fixed to arbor $a$ is a magnet, A, somewhat resembling a dynamo-armature. The opposite poles of magnet A, Fig. 2, are covered with rings $b$, of non-magnetic material—such as brass—and form contact-stops with the field-poles of M. The armature has a double winding composed of wires 11 and 12, normally including in their closed circuit a local battery, Z. This keeps a current established in the double winding, which is ineffective on account of the double winding, and permits a more rapid and more powerful action when the coil of wire 11 or of wire 12 is short-circuited. Wire 6 is connected to a central intermediate point in the circuit of wires 11 and 12. Its opposite end is connected to a circuit-closer operating to make contact with either wires 11 or 12, and when contact is so made that wire with which contact is made is practically short-circuited or cut out of circuit. This allows the current flowing in the other winding to become effective, and the direction in which the current flows effectively is determined by short-circuiting one coil or the other—that is, either wire 11 or wire 12. In one case magnet A takes one position; in the other case it takes the other position. The three wires connected with the magnet A are led to three insulated rings, 90 91 92, on the shaft $a$, and three brushes, 50 51 52, rest upon these rings and continue the circuit to the local battery and circuit-controllers, as described.

V is an indicating-instrument, preferably a voltmeter. Its opposite terminals are respectively connected to opposite terminals of the battery B. The voltmeter V is provided with a scale and indicating-needle. The needle takes up its position against stop 80, which is connected by wire 8 to coil 11 when the electro-motive force of the battery rises to a predetermined point — say its maximum — and it takes up its position against the contact-stop 70, which is connected by wire 7 to coil 12 whenever the electro-motive force of the battery falls to a predetermined point.

C, Figs. 1 and 2, is a master-cell. This is a cell of secondary battery of substantially the same size and capacity as those composing the series B. It is furnished with a circuit-closing arm, E, connected to the wire 6, and a contact-stop, $t$, electrically connected to coil 11. This circuit-closer and the circuit-closer on one side of voltmeter V (that is, the maximum-charge side) operate in the same sense and perform the same functions.

The circuit-closer E is controlled by an inverted dish or bell floating or balanced upon the surface of the liquid L in cell C. It is balanced by the arm E, which is connected with it and pivoted to the edge of the cell. A pipe, P, forms an outlet for the gas accumulating under dish $d$. This accumulation of gas occurs when the cell becomes charged or when the intensity of the charging is abnormally large, as is well understood. The outlet for gas through flexible pipe P is controlled by a cock, $c$, connected by pitman $p$ with a crank, $c'$, on the arbor $a$, carrying magnet A, this detail being shown in Fig. 2.

In the position of the apparatus shown in Fig. 1 the battery is cut out of the charging-circuit. It is near full charge and is supplying the lamps 1. We may trace circuit from the dynamo via main lead 4, mercury-cup $m^4$, to cup $m^6$, lead 4, through station S', returning by lead 3 to the dynamo. The field-coils $f$, in circuit with two cells of battery B, are permanently polarized. The double winding 11 12 on magnet A in circuit with local battery Z has no magnetizing effect. Magnet A therefore rests in the position where it has been left by the last operation.

As battery B becomes discharged, its electro-motive force falls, and the needle of the indicating-instrument takes up its position against the stop 70. This forms a short circuit round one winding on magnet A, the short circuit being via 70 7 12 52 92, one winding of the magnet A, to wire 6, to the needle of voltmeter V. This renders the current in the second winding on A effective—that is, in coil 11. Magnet A is therefore tilted to its opposite limit, changing the switching device and the position of battery B. The change is produced by a sharp sudden movement due to the rapidity with which the magnet A acts under the effect of the established current from battery Z. The circuit now passes from dynamo D via 4 $m^4$ 101 $m'$ $m$ 40 B 30 $m^3$ $m^2$ 100 $m^6$ to 4, and returns by wire 3. The battery B is now in the charging-circuit. Preliminary to the introduction of battery B with respect to the charging-circuit and during the process of changing the position of the switching device the contact operating in cup $m^4$, being somewhat shorter than the others, leaves its mercury-cup $m$ before contact is broken with cup $m^5$, thus temporarily including the resistance R, circuit passing via 4 $m^4$ R $m^5$ $m^6$ to 4; but the contact operating in cup $m^5$ immediately thereafter leaves its mercury-cup $m^5$, when the resistance R is excluded, while simultaneously the battery B is introduced, as first described.

The result of first introducing a resistance in amount having an effect on the charging-circuit equal to the effect produced by the presence of the battery B is beneficial, as it protects the battery from the shock due to suddenly subjecting it to the action of an abnormally-strong current, and also prevents sparking at the contact-points. The process of charge is immediately commenced, the parts remaining in the described position until the condition of full charge is reached, the voltmeter gradually changing its indication from electro-motive force of discharge to the electro-motive force of complete charge. The position of magnet A remains unchanged until the needle of V makes contact with stop 80, for when the needle leaves contact 70 the double winding on A is again in circuit with Z, and the effect of Z is neutralized. When the needle of V contacts with stop 80, the opposite coil of A is rendered effective, the coil first rendered effective this time being short-circuited via 80, 8, 11, 91, and 90, coil of A 6 to the needle of V, and coil 12 is active. The magnet A is tilted to the opposite position, substantially as shown in the drawings, the main circuit passing via 4, $m^4$, $m^6$ to 4, 3, and D, contact with cups $m$ $m'$ $m^2$ $m^3$ being broken. On this movement of the switching device the battery is first cut out and resistance R is simultaneously inserted for a brief interval, the operation being the reverse of that described when introducing the battery.

The circuit-closer E is controlled by the accumulation of gas in the cell C. This becomes active when the period of maximum charge is exceeded or when the cells are subjected to a rate of charge too rapid to permit of the normal results of the process of charge. The lever E is connected to the wire 6, and the electrical contact-stop $t$ is connected by wire 9 to the terminal of coil 11 of the magnet A. It will be seen that the circuit-closer formed by the parts E and $t$ are duplicates, so far as their electrical connections go, of the needle and contact-stop 80 of the indicating-instrument V, which operate to remove the battery from the charging-circuit.

The operation of this device is as follows: Assuming the battery to have been placed in the charging-circuit, as heretofore described, if the intensity of current is greater than that which the battery is calculated to safely receive, gas will be given off at the plates, and, rising, will accumulate under the bell or dish $d$. A sufficient quantity will soon accumulate to raise bell $d$, tilting lever E into contact with stop $t$. One of the windings or coils on magnet A will be short-circuited, and the switching apparatus will be caused to assume the position shown in Fig. 1, as heretofore described. When the battery is in the charging-circuit, magnet A is in position to hold cock $c$ closed. When the switch or circuit-closer E is operated, the magnet A is tilted into position to open cock $c$ and allow the gas to escape from $d$ and the parts to resume their normal position.

What I claim, and desire to secure by Letters Patent, is—

1. The combination of a primary generator of electricity located in a charging-circuit, a secondary battery to be charged from said circuit, a switching device for changing the position of said battery with respect to the charging-circuit, and means for automatically controlling said switching device, consisting of an indicating-instrument in circuit with the battery, a local circuit operated thereby, and a polarized electro-magnet having a double winding, substantially as described.

2. The combination of a charging-circuit containing a suitable source of electricity, a secondary battery, and means for automatically changing the position of said battery with respect to said circuit, consisting of a suitable switching device, an electro-magnet having two coils or windings, a local battery normally in circuit with both windings, and means for rendering either coil effective, consisting of an indicating-instrument in circuit with the battery and operating a local-circuit switch, substantially as described.

3. The combination of a charging-circuit containing a suitable source of electricity, a secondary battery, and means for automatically changing the position of said battery with respect to said circuit, consisting of a suitable switching device, an electro-magnet for operating said device, a local circuit therefor, an indicating-instrument in circuit with the battery controlling said local circuit, and a circuit-closer in said local circuit operated by the accumulation of gas due to the current of charge, substantially as described.

4. The combination of a charging-circuit containing a suitable source of electricity, a secondary battery, a suitable switching device for inserting and withdrawing said battery with respect to said circuit, means for automatically operating said switch in either direction, and means for operating said switch to withdraw said battery, consisting of a circuit-closer controlled by the accumulation of gas in a cell due to the operation of the charging-current, substantially as described.

5. The combination of a charging-circuit containing a suitable source of electricity, a secondary battery, a switching device for inserting and withdrawing said battery with respect to said circuit, means for automatically operating said device, consisting of a permanently-magnetic field, a magnetic core in said field having two parallel windings, a local battery in circuit with both windings, and a circuit-closer for practically neutralizing one winding to render the other effective, substantially as described.

6. The combination of a charging-circuit containing a suitable source of electricity, a secondary battery, a switching device for inserting and withdrawing said battery with respect to said circuit, and means for automatically operating said device to withdraw said battery when subjected to a current of abnormal intensity or duration in the charging-circuit, consisting of an electro-magnet, a local circuit therefor, a circuit-closer in said local circuit, and a cell of battery having an inverted dish or bell to catch the evolved gases, a pipe or outlet, and a cock or valve controlling the passage through said pipe, substantially as described.

7. The combination of a charging-circuit containing a suitable source of electricity, a secondary battery, an artificial resistance in amount equal to the effect produced by the counter electro-motive force and resistance of said battery, and a switching device for inserting and withdrawing said battery and said resistance with respect to the charging-circuit, successively, substantially as described.

WILLIAM W. GRISCOM.

Witnesses:
DANIEL E. DELAVAN,
D. H. BATES.